UNITED STATES PATENT OFFICE.

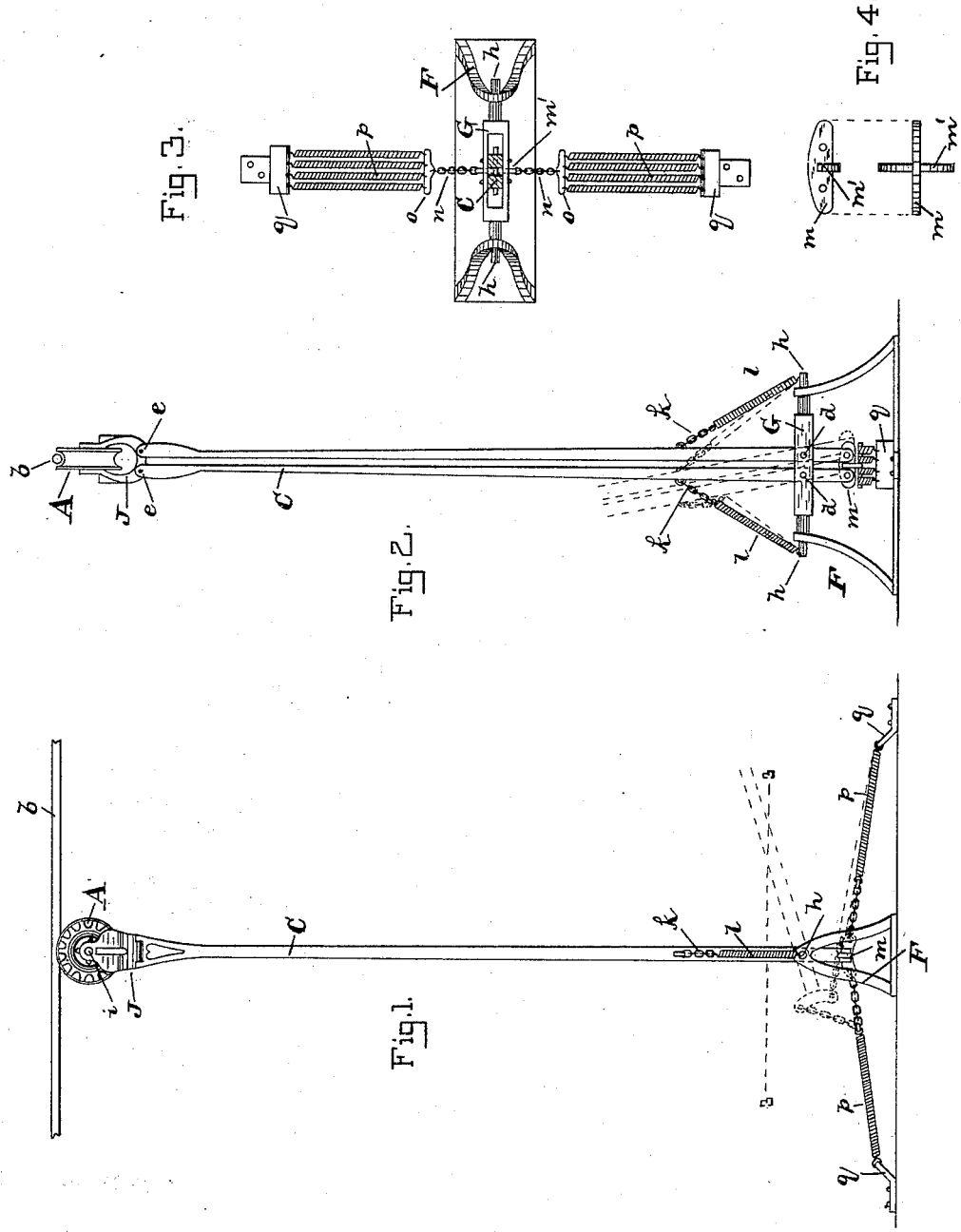

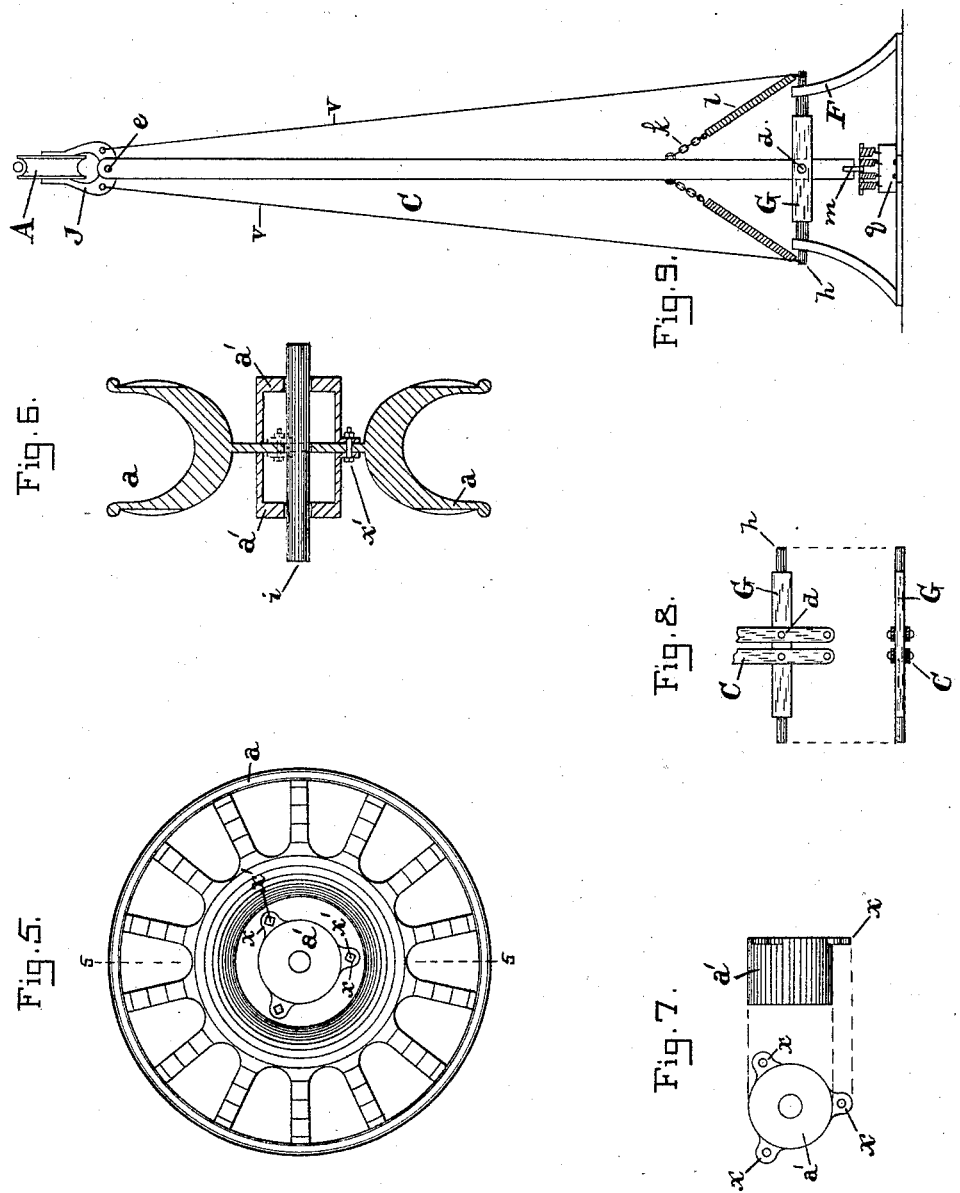

DAVID A. AINSLIE, OF RICHMOND, VIRGINIA.

TROLLEY FOR ELECTRICAL RAILWAYS.

SPECIFICATION forming part of Letters Patent No. 436,571, dated September 16, 1890.

Application filed May 8, 1890. Serial No. 351,077. (No model.)

*To all whom it may concern:*

Be it known that I, DAVID A. AINSLIE, a citizen of the United States, residing at Richmond, in the county of Henrico and State of Virginia, have invented certain new and useful Improvements in Trolleys for Electrical Railways, of which the following is a specification.

My invention relates to a contact device or trolley for the separate motor-cars of electric railways, and its purpose is to establish electrical connection between the elevated current-supply wire or conductor and the motor of the car.

The invention is illustrated in the accompanying drawings, in which—

Figure 1 is a side view of the device as it appears on the roof of the motor-car. Fig. 2 is a front or back view of the device as seen on the motor-car. Fig. 3 is a plan view of the supporting-frame and front and back springs. Fig. 4 shows two views of the cross-connecting piece. Fig. 5 is a detail side view of the trolley or contact wheel. Fig. 6 is a vertical cross-section of the trolley-wheel. Fig. 7 shows two views of one of the cups for forming the hub of the trolley-wheel. Fig. 8 shows two views of modified form of gimbal frame or bar. Fig. 9 shows a front or back view of a modified form of contact device.

The letter A designates the trolley or contact wheel; $b$, the overhead conductor; C, the parallel arms for supporting contact-wheel; F, the supporting-stand on the roof of the motor-car; and $l$ $p$, springs for keeping the parallel arms C in an upright position.

The trolley or contact wheel A is made up of three parts, comprising a grooved rim portion $a$ and two cup portions $a'$. (See Figs. 5, 6, and 7.) Each cup portion has three projecting lugs $x$ at its open side equidistant around its circumference, and each of the said lugs has a bolt-hole through it. The two cups $a'$ are bolted to the grooved portion $a$—one at each side—by bolts $x'$, passing through the lugs. The two cups form, as shown in Fig. 6, a broad hub and bearing for the trolley-shaft $i$, which passes entirely through the said hub and into bearings in the arms of the U-shaped trolley-wheel holder J. This trolley A travels along and makes contact with the current-supply conductor $b$.

The trolley-wheel-supporting arms C, of which there are two, are parallel, and each arm is pivoted at $e$ to the wheel-holder J and at $d$ to a gimbal frame or bar G. The said two pivots $d$ and $e$ of each arm must be an equal distance apart, so that the two arms C will remain parallel and the contact-wheel A maintain a vertical position when the arms C tilt sidewise.

The gimbal frame or bar G has trunnions $h$ in the supporting-frame F, which is fixed to the roof of the motor-car. Thus it will be seen that by this construction the arms C may have a lateral movement in any direction. Each of the supporting-arms C above the said gimbal-frame G is connected with the end of one of the trunnions $h$ of the gimbal-frame by a spiral spring $l$. I have shown in the drawings a chain $k$ attached to each of the spiral springs $l$. The contraction of said springs $l$ prevent the trolley or contact wheel and supporting-arms C from falling from side to side. It will therefore be seen upon examining Fig. 2 that when the parallel arms C are thrown to one side the spring $l$ and attached chain $k$ on that side will hang loose and offer no resistance; but were there no chain used then a resistance would be offered by the spring on the side toward which the arm tilts. The lower ends of the supporting-arms C are each pivoted to an opposite end $m$ of a cross-connecting piece, (see Fig. 4,) and to each of the two other ends $m$ of said cross-piece is attached a chain $n$, which is fastened to a bar $o$, to which four spiral springs $p$ are attached. The other end of each of said springs is connected to a bar $q$, bolted to the roof of the car. The contraction of these springs $p$ prevents the contact-wheel and supporting-arms C from falling either forward or backward and tends to keep them elevated or upright. It will be seen by Fig. 1 that the arms C are indicated as thrown to the right in dotted lines, and the chain $n$ and springs $p$ on the other or left side are hanging loosely, while the chain $n$ and springs $p$ on the right side are taut, these springs exerting their entire force to raise the arms C into a perpendicular position, the opposite springs offering no resistance from the manner in which the chain $n$ is employed.

A conducting-wire $r$ is connected to the contact-wheel holder J and leads to the motor on the car.

Fig. 8 shows a modification in the pivoting attachment of the supporting-arms C with the gimbal-bar G. In this case the arms C are slotted at their pivot-points $d$ to receive the gimbal-bar G.

Fig. 9 shows a modified form of the supporting-arm. In this case a single supporting-arm C is pivoted at $d$ in the gimbal-frame G, and at $e$ to the trolley-wheel holder J. Two cords or wires $v$—one each side of the supporting-arm—have one of their ends attached to the wheel-holder J and the other ends to the ends of the gimbal-frame G. Thus it will be seen that the contact-wheel will still maintain a vertical position when the single supporting-arm C is tilted or moved sidewise. This Fig. 9 device, therefore, is the equivalent of that shown in Fig. 2 in the combination where the springs and chains enter as elements.

My invention is not limited to any particular number of pivoted supporting-arms.

Having described my invention, I claim—

1. The herein-described trolley or contact wheel, consisting of the grooved rim portion $a$, made in one piece, a broad hub made of two cup portions $a'$, each secured to an opposite side of the center of said rim portion, and shaft $i$, passing loosely through the center of said two cups, as set forth.

2. The combination of a supporting-stand, a trolley-wheel holder, a pivoted supporting-arm extending up from the stand and pivoted at the upper end to the said trolley-wheel holder, a chain $k$, and an attached spiral spring $l$, connected at one side of the supporting-arm and a like chain and spring connected at the opposite side, for the purpose set forth.

3. The combination of a supporting-stand, a gimbal-frame on the stand, a trolley-wheel holder, a pivoted supporting-arm extending up from the stand and pivoted at the upper end to the said trolley-wheel holder, a chain $k$, and an attached spiral spring $l$, connected at each of two sides of the supporting-arm and attached to the gimbal-frame.

4. The combination of a supporting gimbal-frame, one or more arms C, pivoted thereto and projecting up therefrom, a cross-piece $m$ $m'$, pivoted to the lower end of said arms below the gimbal-frame, and spiral springs P, connected with the opposite ends of said cross-piece, and said springs rigidly secured, as set forth.

5. The combination of a U-shaped trolley-holder, one or more arms C, pivoted thereto and also pivoted to a supporting gimbal-frame, means, substantially as described, to maintain the trolley-holder in a vertical position when the said arms tilt sidewise, and a chain $k$, and an attached spiral spring $l$, connected at one side of the supporting-arm, and a like chain and spring connected at the opposite side, for the purpose set forth.

In testimony whereof I affix my signature in the presence of two witnesses.

DAVID A. AINSLIE.

Witnesses:
CHAS. A. ROSE,
AUSTIN BROCKENBROUGH.